Patented Feb. 27, 1940

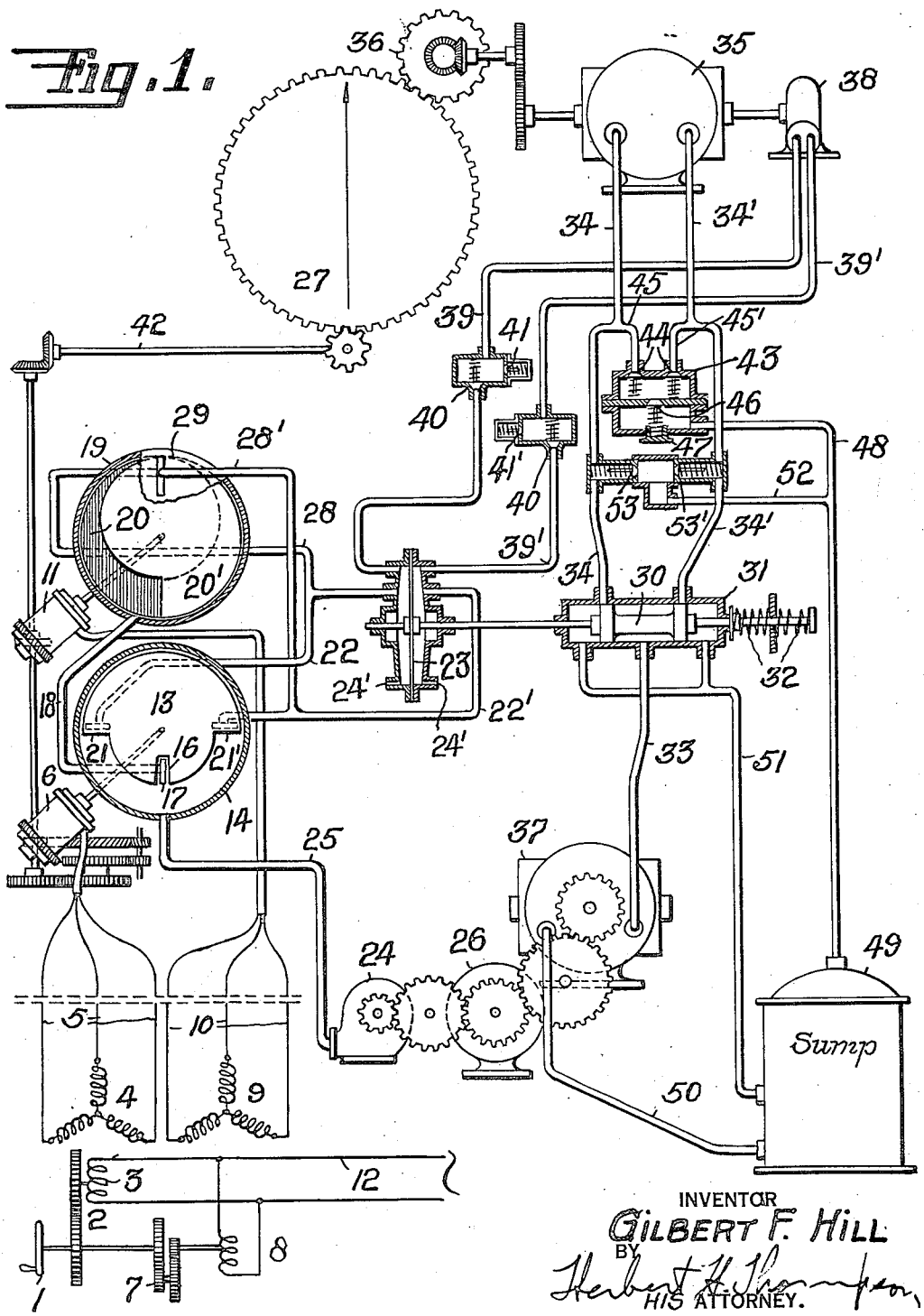

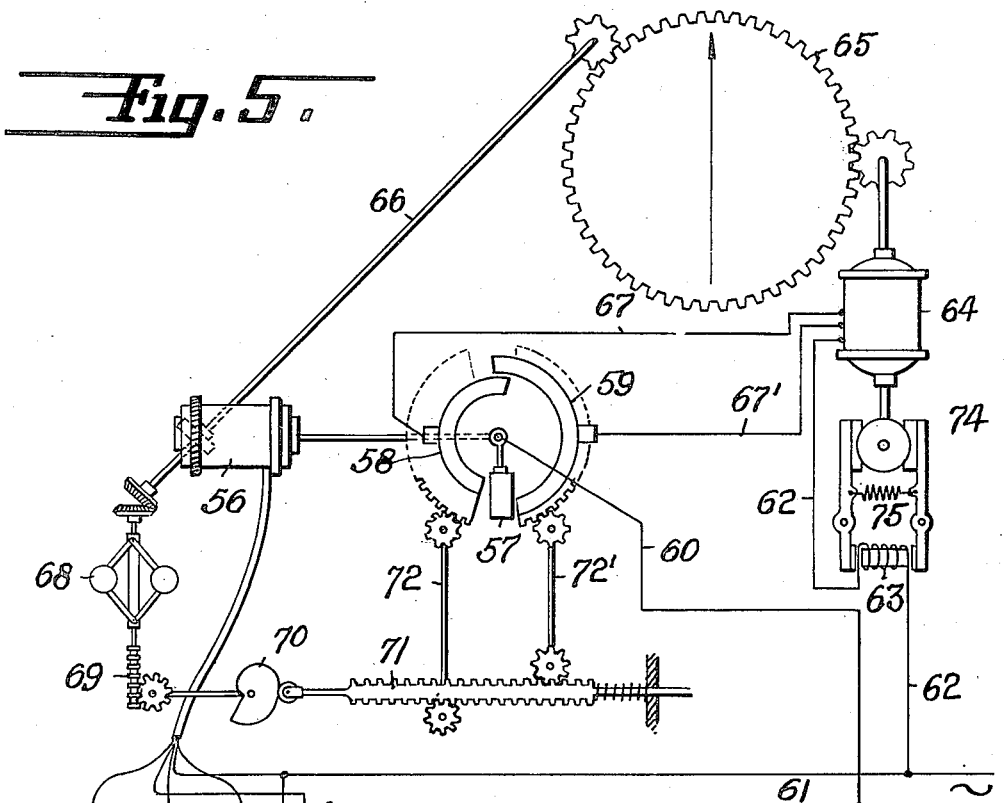

2,191,792

UNITED STATES PATENT OFFICE 2,191,792

ANTIHUNTING POSITIONAL CONTROL SYSTEM

Gilbert F. Hill, Ridgefield, N. J., assignor to Sperry Gyroscope Company, Inc., Brooklyn, N. Y., a corporation of New York Application February 13, 1937, Serial No. 125,541

10 Claims. (Cl. 121—41)

This invention relates, generally, to the remote positional control of heavy objects, such as ships' rudders, from a controlling object having small power, such as a hand operated controller or a sensitive instrument, and the invention has reference, more particularly, to an antihunting positional control for such objects.

A heavy object such as indicated above has ponderable inertia and, when driven by a reversible power motor, is subject to hunting around its position of synchronism with the controlling object. The control is also often jerky due to the fact that the motor is first lagging behind, then catching up with the controller, and then overrunning the controller position. One of the causes of these troubles is that the torque exerted by the motor is generally proportional to the displacement between the controlling object and the controlled object, so that when the controlling object first starts to move, a lag will occur before the motor starts, and after it starts, it will increase in speed and rapidly overtake the controlling element, overshooting the position of zero torque. Unless artificially restrained, the motion of the controlled object will be oscillatory about the true correspondence position.

It is known that the angular distance a rotatable body will turn through in coasting to rest varies as the square of the velocity of the body, and hence it follows that if a controlling device is used providing a signal or control impulse having a value proportional to the square root of the angular displacement of the controlled object with respect to the controlling object, and this signal is opposed by a feed back signal derived from the operation of the controlled object and of a value proportional to the velocity of the controlled object, then, in such case, these opposing signals will become equal and cause the cutting off of the supply of power to the servo motor driving the controlled object at a time sufficiently in advance of actual synchronism of the objects to enable the controlled object to come to rest, under the action of a suitable braking force, at a point in exact synchronism with the controlling object, thereby eliminating hunting of the controlled object about the point of zero relative displacement.

The principal object of the present invention is to provide a novel positional control system embodying the principles just mentioned, wherein means responsive to the speed of operation of the controlled object is employed for causing the shutting off of the power to the controlled object servo motor in advance of actual synchronism of the objects and for causing the application of a braking force to the controlled object, whereby the same is caused to come to rest in synchronism with the controlling object.

Another object of the present invention lies in the provision of a novel positional control system of the above character wherein feed back or speed governor means responsive to the velocity of the controlled object is used to oppose the controlling force or signal from the controlling object, so that driving power for the controlled object is shut off in advance of actual synchronism of the objects.

Still another object of the present invention is to provide a novel system employing a pneumatic pick-off from the controlling means adapted to supply actuating air pressure, of a magnitude proportional to the square root of the relative displacement of the objects, to a diaphragm controlling the operating valve of the controlled object servo motor, and air pump means driven from the servo motor for supplying feed back suction to said diaphragm proportional to the velocity of the controlled object, so that the motor operating valve is controlled in response to the pressure resulting from the combination of the pick-off output with the opposing air pump feed back velocity output, whereby, when these opposed pressures are equal, the valve will close, thereby shutting off the supply of power to the servo motor, the controlled object thereafter driving the servo motor as a pump to force pressure fluid against a predetermined resistance serving to bring the controlled object to rest in substantial synchronism with the controlling object.

Other objects and advantages will become apparent from the specification, taken in connection with the accompanying drawings wherein the invention is embodied in concrete form.

In the drawings,

Fig. 1 is a schematic view, partly in section, of the novel antihunting positional control system of this invention.

Fig. 2 is a detail view showing one of the cam pick-off discs.

Fig. 3 is a detail view showing the other cam pick-off disc.

Fig. 4 is a transverse sectional view of the high speed pick-off casing, showing both cam pick-off discs therein.

Fig. 5 is a schematic view of a somewhat modified antihunting positional control system.

Similar characters of reference are used in all of the above figures to indicate corresponding parts.

Referring now to Figs. 1 to 4, the reference numeral 1 designates a controlling object, such as a hand wheel, that is connected through 1:1 gearing 2 to the rotor 3 of a synchronous generator of the "selsyn" type having a three-phase stator winding 4 that is connected by leads 5 to the corresponding winding of a receiver synchronous motor or "selsyn" 6 located near the controlled object, which ordinarily is remote with respect to the controlling object 1. The hand wheel 1 is also connected through step-up gearing 7 to the rotor 8 of a high speed transmitter synchronous generator or "selsyn" having a three-phase stator 9 also connected through leads 10 to the remote receiver synchronous motor or "selsyn" 11. The rotors 3 and 8 are wound single phase and are supplied with single phase current from leads 12. A practical speed ratio for the high speed transmitter 8, 9 would be 36:1 in comparison with the 1:1 speed ratio of the low speed transmitter 3, 4.

The shaft of the low speed receiver 6 is connected to turn a cam pick-off disc 13 turnable within a cylindrical casing 14. The disc 13 is provided with a radial notch or recess 16 that is somewhat wider, and normally registers with, a port 17 provided in the wall of casing 14 and communicating, through a pipe 18, with a second cylindrical casing 19 at a point intermediate two opposed cam pick-off discs 20 and 20' therein.

The cam pick-off disc 13 is so shaped as to provide radial edge portions 21 and 21' that serve as baffles normally overlying transversely aligned ports provided in the casing 14 and communicating with pipes 22 and 22' leading to opposite sides of a pneumatic diaphragm 23, contained in a suitable housing.

The casing 14 is adapted to be supplied with air under pressure, furnished from an air pump 24 through a pipe 25, the said pump 24 being driven from a constant speed motor 26 through suitable gearing. With cam pick-off disc 13 as normally positioned, as shown in Fig. 1, corresponding to the synchronous positioning of the controlled object 27 with the controlling object or controller 1, air from pipe 25 passes into casing 14 and out through port 17, pipe 18, into casing 19, intermediate the cam pick-off discs 20 and 20'. These discs are particularly shown in Figs. 2, 3 and 4 and normally over-lie radial ports provided in casing 19, which ports communicate with pipes 28 and 28'. Pipe 28 communicates with pipe 22, leading to one side of the diaphragm 23, whereas pipe 28' communicates with pipe 22', leading to the other side of this diaphragm.

The peripheries 29 of the pick-off cam discs 20 and 20' are so shaped that when these discs are turned in one direction by receiver 11 in response to a signal received from transmitter 8, 9, one of these discs will pass such an amount of air into its corresponding pipe 28 or 28' that the pressure thereby established upon the diaphragm 23 will vary as a direct function of the relative displacement of the objects such as the square root of such displacement. To accomplish this, the cam pick-off discs 20 and 20' are oppositely disposed within the casing 19, whereby the turning of these discs in one direction effects the application of pressure to one side of the diaphragm 23, and the turning of these discs in the opposite direction causes pressure upon the opposite side of the diaphragm proportional to a function of the angular displacement. Normally, i. e., when the controlled object 27 is in synchronous position with respect to hand wheel 1, both of the cam discs 20 and 20' completely overlie their radial slots, thereby preventing pressure from being applied to either side of the normally centralized diaphragm 23.

Diaphragm 23 is connected to operate a servo motor control member or hydraulic valve 30 movable within a valve casing 31 and normally centralized therein by means of springs 32. Valve 30 is of the balanced, piston type and, when shifted by diaphragm 23 from neutral position, is adapted to allow the flow of pressure fluid, such as oil, from a supply pipe 33 selectively to pipes 34 and 34' leading to a constant displacement hydraulic motor 35, connected in driving relation, through gearing 36, to the controlled object 27. Pipe 33 is connected to a variable displacement hydraulic pump 37 that is driven from motor 26 through suitable gearing.

The driving shaft of motor 35 is connected to drive an air pump 38 whose input suction and output pressure is responsive to the speed of operation of hydraulic motor 35, and hence to the speed of operation of object 27. One side of the pump 38 is connected through piping 39 to one side of the diaphragm 23, whereas the other side of the pump 38 is connected by piping 39' to the other side of diaphragm 23. Check valves 40 and 40' are provided in the pipes 39 and 39', and relief valves 41 and 41' are also provided in these pipes. A follow-up connection 42 extends from the object 27 to the receiver "selsyns" 6 and 11 through the use of suitable gearing, as shown.

In order to effect the braking of the object 27 in use, a suitable frictional by-pass hydraulic fluid circuit is provided between the opposite sides of motor 35. This is accomplished as by use of a casing 43 having check valves 44 communicating with branch pipes 45 and 45', leading to pipes 34 and 34', respectively. Casing 43 is also provided with a spring pressed fluid brake valve 46, the tension of which is adjustable by means of a screw cap 47, the escape side of valve 46 being connected through pipe 48 to a reservoir or sump 49 that is connected by pipe 50 to the pump 37. Piping 51 also connects sump 49 with the end portions of valve casing 31. A pipe 52 connects with pipe 48 and, through check valves 53. 53', to pipes 34 and 34', respectively.

In operation, as long as the controlled object 27 is in synchronism with the hand wheel 1, the cam pick-off discs 13, 20 and 20' are in the positions shown in Fig. 1, in which positions air supplied from pump 24 is blocked by these pick-off discs from reaching the diaphragm 23, so that valve 30 is retained in neutral or central position by springs 32, in which position of the valve no pressure fluid is supplied to the motor 35. Assume, however, that the hand wheel 1 is now turned, thereby causing the transmitters 3, 4 and 8, 9 to transmit a signal voltage, thereby effecting rotation of the receivers 6 and 11. Inasmuch as the high speed receiver 11 operates at a much higher speed than the hand wheel 1, as soon as the hand wheel 1 starts to turn, one of the pick-off cam discs 20 or 20', depending upon the direction of rotation, will start to uncover its radial port so that air is allowed to pass to one side of the diaphragm 23. Thus, assuming that the pick-off cam disc 20' turns so as to commence uncovering its radial port, then air under pressure, varying with the relative displacement of the objects, is admitted through pipe 28' to the right hand side of diaphragm 23, thereby causing this diaphragm to move to the left and effect the communication of pipe 33, through valve 31, with pipe 34, resulting in the operation of fluid motor 35 in the proper direction to again bring the object 27 into synchronism with the hand wheel 1. The fluid discharge from motor 35 in this case discharges through pipe 34', through valve casing 31 and piping 51, back to the reservoir or sump 39 for recirculation through the pressure pump 37.

Owing to the nature of the heavy object 27, this object first starts up slowly, so that appreciable lag exists between the hand wheel 1 and this controlled object, with the result that motor 35 gradually picks up speed and increases in speed rapidly so as to compel object 27 to catch up with the hand wheel 1. However, owing to the great mass of object 27, this object tends to overrun the hand wheel 1 when the hand wheel is brought to rest, owing to the kinetic energy built up in the rotating object 27. The air pump 38 and associated apparatus overcomes this tendency of the object 27 to overrun, and hence to hunt about its position of correspondence with the hand wheel 1. As the object speeds up, the air pump 38 applies intake suction through pipe 39', proportional to the velocity of the controlled object 27. This suction is exerted through pipe 39' and check valve 40 to the right side of the diaphragm 23, thereby opposing and tending to offset the pressure applied to this side of the diaphragm through pipe 28', the net result of this dual action being that valve 30 is moved toward closed position in advance of the actual synchronization of the objects so that before the object has actually reached synchronous position with respect to the hand wheel 1, the valve 30 is closed, thereby shutting off the supply of pressure fluid to the motor 35 and causing the object to coast into synchronous position.

In order that this coasting period shall not be unduly long, it is essential that some braking force be used, and this braking force is provided by the spring pressure fluid brake valve 46. Thus, as soon as the valve 30 closes and the supply of pressure fluid to motor 35 is cut off, this motor is driven as a pump by the heavy object 27, thereby causing this motor 35 to drive fluid out through pipe 34', branch pipe 45', past check valve 44 and brake valve 46, through pipe 48, pipe 52 and check valve 53, to pipe 34, for recirculation through the motor 35, now acting as a pump. The pressure valve 46 is so set by means of screw cap 47 as to brake the object 27 sufficiently to bring this member to rest in exact synchronism with the controlling object 1. Since the mass of the controlled object 27 is fixed, it is a very simple matter to adjust the tension of valve 46 to effect the desired result at all times, thereby eliminating hunting of the object 27 around its position of synchronism with the hand wheel 1.

It is to be noted that when air pump 38 is supplying suction to the right hand side of diaphragm 23, the pressure output of air pump 38 supplied through pipe 39 escapes to the atmosphere through the relief valve 41, and is not applied to the other side of diaphragm 23.

In the event that the hand wheel 1 should become displaced at a relatively large angle with respect to the object 27, such as may happen when the hand wheel 1 is turned when the system is not operating, then, in that event, when the system is again put in operation, the low speed air pick-off disc 13 will be displaced sufficiently with respect to port 17 so as to overlie this port, in which event the supply of air pressure to casing 19 is shut off and at the same time one or the other of the radial edge portions 21 or 21' of the cam pick-off disc will uncover its corresponding radial port, depending upon the direction in which the hand wheel 1 has been turned with respect to object 27. Thus, assuming that disc 13 has been turned counterclockwise, then air pressure is supplied to pipe 22', thereby applying pressure to the right hand side of diaphragm, as before, and effecting operation of the pump 35 by the coarse receiver 6 until the object 27 is brought near synchronism with the controlling object 1, whereupon the port 17 will again be uncovered, permitting the high speed receiver 11 to thereafter bring the controlling and controlled objects into exact synchronism.

If the hand wheel 1 is turned in the opposite direction, air pressure will be applied to the left hand side of diaphragm 23, as is obvious, effecting the operation of the object in the reverse direction, the movement of this object also being braked as it approaches synchronism with the hand wheel 1 through the operation of the pump 38 and the fluid brake valve 46.

Inasmuch as the air pressure applied initially to the diaphragm 23 varies as the square root of the relative displacement of the objects, due to the shape of pick-off discs 20 and 20', and as the air pump 38 opposes this control pressure with a feed-back suction or negative pressure responsive to the velocity of the controlled object, then it follows that the opposing forces or signals become equal and cause cutting off of the supply of power to the servo motor 35 at a time sufficiently in advance of the actual synchronism of the objects to enable the object 27 to come to rest under the action of the substantially uniform braking force provided by valve 46 at a point in exact synchronism with the controlling object 1, thereby eliminating hunting of the controlled object with respect to the point of zero relative displacement.

In the form of the invention shown in Fig. 5, the transmitter or "selsyn" 54, 55 is connected to operate the receiver "selsyn" 56 that serves to actuate an electric valve or roller contact 57 cooperable with angularly adjustable contact segments 58 and 59. Roller contact 57 is connected through lead 60 to one of the A. C. supply leads 61, the other supply lead being connected through a lead 62 and brake winding 63 to an electric servo motor 64 connected to drive a controlled object 65 having a follow-up connection 66 with the receiver 56.

The motor 64 may be a series type A. C. motor with reversing field windings, the lead 62 being connected to one side of the armature and the other side of the armature connected to the field windings, whose terminals are connected through leads 67 and 67' to brushes bearing on the segments 58 and 59.

A fly-ball governor 68 is driven from the follow-up connection 66 so as to be responsive to the speed of the controlled member 65. Governor 68 operates a rack 69 that in turn operates through a spur gear to rotate a cam 70, on which rides a roller carried by a double rack 71, the opposite teeth of which rack drive gears connected through shafts 72 and 72', that are geared to turn the segments 58 and 59.

In operation, when the hand wheel 73 is turned, the voltage signal produced by transmitter 54, 55 causes receiver "selsyn" 56 to correspondingly turn the roller contact 57 so that this contact will move from its dead spot position shown to engage either segment 58 or 59, depending upon the direction in which the hand wheel 73 is turned. Assuming, for example, that roller contact 57 engages segment 58, the circuit is closed for motor 64 as follows: upper supply lead 61, through lead 62, brake winding 63, motor 64, lead 67, segment 58, roller 57 and lead 60, back to the A. C. supply. The energizing of the brake winding 63 effects the release of brakes 74 by overcoming the tension of spring 75 thereof, and simultaneously the motor 64 starts to operate in the proper direction for moving the controlled object 65 into synchronism with the hand wheel 73, the follow-back connection 66 serving to reposition the rotor of the receiver 56 with respect to the position of rotor 54 of the transmitter. As the object 65 starts to turn, its speed increases, thereby causing fly-ball governor 68 to operate rack 69 to turn cam 70 and effect longitudinal movement of rack 71, thereby causing the gearing connected thereto to turn segment 58 in a clockwise direction to thereby enlarge, in effect, the dead spot of the controller contactor so that before the objects have actually reached synchronism, the roller 57 will move off the segment 58 and onto the dead spot, thereby deenergizing motor 64 and automatically applying the brake 74 through the operation of its spring 75, so that thereafter the controlled object 65, in coming to rest, is braked by the uniform braking force provided by brake 74, resulting in causing the controlled object to come to rest in synchronism with the controlling object 73 without overrunning or hunting.

Similarly, if the hand wheel 73 had been turned in the opposite direction, the roller contact 57 would have engaged segment 59, causing operation of motor 64 in the reverse direction, and the resulting pick-up in speed of the controlled object 65 would result in the operation of fly-ball governor 68 to effect the turning of segment 59 to enlarge the effective length of the dead spot of the contactor, whereby the motor 64 would be stopped in advance of actual synchronism of the objects, the controlled object 65 coasting to rest under the braking action of brake 74 and into substantial synchronism with the controlling object 73.

As many changes could be made in the above construction and many apparently widely different embodiments of this invention could be made without departing from the scope thereof, it is intended that all matter contained in the above description or shown in the accompanying drawings shall be interpreted as illustrative and not in a liimting sense.

Preferably, the housing of diaphragm 23 is provided with bleed apertures 24' on opposite sides of the diaphragm.

What is claimed is:

1. In a positional control system of the fluid pressure type, a controlling object, a controlled object, a fluid pressure motor for driving said controlled object, graduated control means for said motor giving control pressures proportional to the relative displacement of said controlling object with respect to said controlled object for driving said motor at a speed proportional to said relative displacement, a pump driven by said controlled object for lessening the action of said control means to effect the cutting off of the supply of fluid to said motor as synchronism is approached, far enough in advance of actual synchronism of said objects to compensate for the momentum of the controlled object.

2. In a fluid pressure positional control system for heavy objects from a controller, differential air flow means for producing at the controller a signal, a reversible power motor for driving the object, relay means operated by said differential air flow for controlling said motor in accordance with the strength and direction of said signal, follow back means between said object and controller, and air pressure feed-back means connected to said relay means for modifying the action of said relay in accordance with the speed and direction of said motor.

3. In a positional control system, a controlling object, a controlled object, a hydraulic motor for driving said controlled object, valve means for controlling said motor, pneumatic pick-off means operative in response to a function of the relative displacement of said objects for controlling said valve means, and means responsive to the speed of said controlled object for opposing the action of said pick-off means to prevent hunting of said controlled object.

4. In a positional control system, a controlling object, a controlled object, a hydraulic motor for driving said controlled object, valve means for controlling said motor, pneumatic pick-off means operative in response to a function of the relative displacement of said objects for controlling said valve means, pneumatic means responsive to the speed of said controlled object for opposing the action of said pick-off means, to thereby effect the shutting off of said valve means prior to the actual synchronization of said objects, whereby hunting of said controlled object is prevented.

5. In a positional control system, a controlling object, a controlled object, a hydraulic motor for driving said controlled object, valve means for controlling said motor, pneumatic pick-off means operative in response to a function of the relative displacement of said objects for controlling said valve means, pneumatic means responsive to the speed of said controlled object for opposing the action of said pick-off means, to thereby effect the shutting off of said valve means prior to the actual synchronization of said objects, and breaking means for said motor operable upon the shutting off of said valve means to effect the stoppage of said controlled object.

6. In a control system, a controller, a heavy object controlled as to position therefrom, a fluid operated motor for driving said object, a valve for controlling the supply of pressure operating fluid to said motor, a pneumatic diaphragm for operating said valve, a pneumatic pick-off operated from said controller for applying pressure upon the sides of said diaphragm, and air pump means driven from said motor for applying reverse pressure to said diaphragm in opposition to the action of said pick-off to thereby prevent hunting of said heavy object.

7. In a control system, a controller, a heavy object controlled as to position therefrom, a fluid operated motor for driving said object, a valve for controlling the supply of pressure operating fluid to said motor, a pneumatic diaphragm for operating said valve, a pneumatic pick-off operated from said controller for selectively applying pressure to the sides of said diaphragm responsive to the square root of the relative displacement of said controller and heavy object, and an air pump driven at a speed proportional to that of said heavy object and connected to apply suction to said diaphragm in opposition to the pressure applied thereto by said pick-off.

8. In a control system, a controller, a heavy object controlled as to position therefrom, a fluid operated motor for driving said object, a valve for controlling the supply of pressure operating fluid to said motor, a pneumatic diaphragm for operating said valve, a pneumatic pick-off operated from said controller for selectively applying pressure to the sides of said diaphragm responsive to the square root of the relative displacement of said controller and heavy object, an air pump driven at a speed proportional to that of said heavy object and connected to apply suction to said diaphragm in opposition to the pressure applied thereto by said pick-off, and braking valve means connected to said motor and operable upon the shutting off of said motor control valve to effect the braking and final stoppage of said object.

9. A remote control for positioning an object from a coarse and fine sending device, comprising a one to one cut-off disc and multiple speed cut-off discs, two chambers for the discs, a source of compressed air connected to the chamber for the one to one disc, a port therein supplying air to the second chamber, said first disc having a notch of limited width for admitting air to said port, a pair of opposite ports in said chamber, one or the other of which is uncovered when the disc turns far enough in either direction to close the first port, the discs in said second chamber being of oppositely spiral contour, cooperating with opposite exhaust ports, a relay valve into which said last named ports and said opposite ports in the first chamber feed, and a servo motor controlled by said valve.

10. In a fluid pressure positional control system, controlling and controlled objects, a fluid motor for driving said controlled object, means for producing a control pressure for said motor responsive to and varying with the positional disagreement of said controlling and controlled objects, means for applying a substantially uniform braking force to said controlled object when said control pressure approaches zero, and feed-back means producing a counterpressure in accordance with a function of the speed of said controlled object for advancing the time of application of said braking force, whereby overrunning is prevented substantially regardless of the speed of the controlled object.

GILBERT F. HILL.